(12) United States Patent
Srikrishna et al.

(10) Patent No.: US 7,542,421 B2
(45) Date of Patent: Jun. 2, 2009

(54) ADAPTIVE CONTROL OF TRANSMISSION POWER AND DATA RATES OF TRANSMISSION LINKS BETWEEN ACCESS NODES OF A MESH NETWORK

(75) Inventors: Devabhaktuni Srikrishna, Sunnyvale, CA (US); Amalavoyal Chari, Sunnyvale, CA (US); Cyrus Behroozi, Sunnyvale, CA (US)

(73) Assignee: Tropos Networks, Sunnyvale, CA (US)

( * ) Notice: Subject to any disclaimer, the term of this patent is extended or adjusted under 35 U.S.C. 154(b) by 721 days.

(21) Appl. No.: 11/223,575

(22) Filed: Sep. 9, 2005

(65) Prior Publication Data

US 2007/0060064 A1 Mar. 15, 2007

(51) Int. Cl.
*H04L 12/26* (2006.01)
*H04L 12/28* (2006.01)
*H04Q 7/00* (2006.01)
*H04B 7/00* (2006.01)

(52) U.S. Cl. .................. 370/235; 370/254; 370/332; 455/522

(58) Field of Classification Search ......... 370/229–234, 370/328–333, 336–338, 465; 455/453, 522
See application file for complete search history.

(56) References Cited

U.S. PATENT DOCUMENTS

| | | | |
|---|---|---|---|
| 5,257,283 A | 10/1993 | Gilhousen et al. | |
| 5,544,196 A | 8/1996 | Tiedemann, Jr. et al. | |
| 5,568,483 A | 10/1996 | Padovani et al. | |
| 5,590,408 A | 12/1996 | Weiland et al. | |
| 5,638,412 A | 6/1997 | Blakeney, II et al. | |
| 5,655,220 A | 8/1997 | Weiland et al. | |
| 5,778,338 A | 7/1998 | Jacobs et al. | |
| 6,480,497 B1 | 11/2002 | Flammer, III et al. | |
| 6,493,331 B1* | 12/2002 | Walton et al. | 370/341 |
| 6,904,021 B2* | 6/2005 | Belcea | 370/252 |
| 7,280,514 B1* | 10/2007 | Chang et al. | 370/335 |
| 7,369,858 B2* | 5/2008 | Backes et al. | 455/453 |
| 2004/0166871 A1* | 8/2004 | Backes et al. | 455/453 |
| 2005/0020213 A1 | 1/2005 | Azman et al. | |
| 2005/0117559 A1 | 6/2005 | Malladi et al. | |
| 2005/0136844 A1 | 6/2005 | Giesberts et al. | |
| 2006/0209721 A1* | 9/2006 | Mese et al. | 370/254 |
| 2007/0002742 A1* | 1/2007 | Krishnaswamy et al. | 370/235 |

* cited by examiner

*Primary Examiner*—Tri H Phan
(74) *Attorney, Agent, or Firm*—Brian R. Short (57) ABSTRACT

A method of optimizing link transmission parameters between access nodes within a mesh network is disclosed. The method includes each access node within the mesh transmitting packets at N different combinations of data rates and power levels. Each receiving node that receives the data packets at one or more of the N combinations, selects a most desirable one of the received combinations. The receiving nodes indicate to the transmitting nodes the selected most desired combination for transmitting to the receiving node.

31 Claims, 7 Drawing Sheets

| 11 Mbps/ 26dBm | 24 Mbps/ 26dBm | 48 Mbps/ 26dBm |
|---|---|---|
| 11 Mbps/ 30dBm | 24 Mbps/ 30dBm | 48 Mbps/ 30dBm |
| 11 Mbps/ 36dBm | 24 Mbps/ 36dBm | 48 Mbps/ 36dBm |

… # ADAPTIVE CONTROL OF TRANSMISSION POWER AND DATA RATES OF TRANSMISSION LINKS BETWEEN ACCESS NODES OF A MESH NETWORK

FIELD OF THE INVENTION

The invention relates generally to wireless communications. More particularly, the invention relates to a method and apparatus for adaptive control of transmission power and data rates between access nodes of a mesh network.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

A wireless network can include a wireless device being connected to a network through a base station that is wired to the network. The wireless device can transmit data packets that are received by the base station and then routed through the network. The wireless network can include many base stations that are each wired to the network. This type of wireless network is limited because it requires wired connection to each base station.

Figure 1:
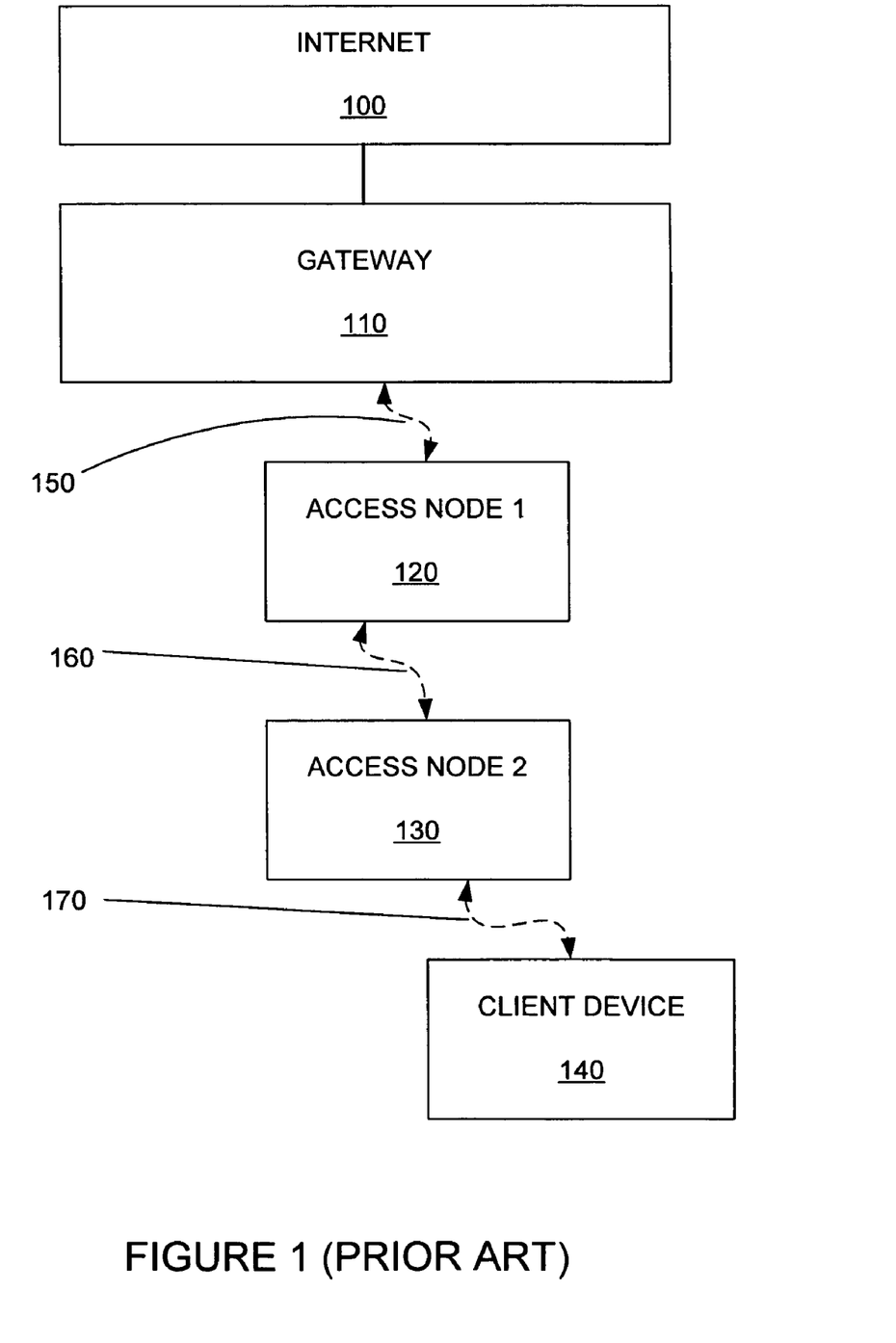
FIG. 1 shows a prior art wireless mesh network

FIG. 1 shows a prior art mesh network. The mesh network includes interconnected access nodes 120, 130. One or more of the access nodes 120, 130 is connected to another network 100 (for example, the internet) through, for example, a gateway 110. A client 140 can connect to the network 100 through the mesh network that includes the access nodes 120, 130 and the gateway 110. Wireless mesh networks are subject to environmental conditions that can influence the quality of transmission between the access nodes. The environmental conditions can include multi-path, interference and transmission signal attenuation.

In wireless networks, different transmission protocols (such as, 802.11) allow the transmission of information at different power levels and data rates. Depending upon the characteristics of the links between the access nodes, some power levels and data rates can be more desirable than others.

In wireless networks, the quality of the links within the mesh network can be asymmetrical. That is, the quality of a link can vary depending upon the direction in which signals are traveling through the link. This can make selecting optimal routes between access nodes harder to identify. Additionally, the quality of the links between the nodes can vary over time.

It is desirable to have a wireless mesh network that can analyze transmission links between access nodes and determine desirable transmission power levels and data rates for each wireless link. It is also desirable that the mesh network be able to determine the quality of routing paths that include the links, through the wireless mesh network, and select an optimal path from among all available routing paths.

SUMMARY OF THE INVENTION

The invention includes a method and apparatus for adaptive control of transmission power and data rates between access nodes of a mesh network.

An embodiment of the invention includes a method of optimizing link transmission parameters between access nodes within a mesh network. The method includes each access node within the mesh transmitting packets at N different combinations of data rates and power levels. Each receiving node that receives the data packets at one or more of the N combinations, selects a most desirable one of the received combinations. The receiving nodes indicate to corresponding transmitting nodes the selected most desired combination for transmitting to the receiving node.

Another embodiment of the invention includes a method of selecting transmission parameters of an access node within a mesh network. The method includes the access node receiving data packets from neighboring access nodes through transmission signals having N combinations of rate and frequency. The access node selects a most desired combination for each link between the access node and each neighboring access node, and the access node communicates the selected combination back to each corresponding neighboring access node.

Other aspects and advantages of the present invention will become apparent from the following detailed description, taken in conjunction with the accompanying drawings, illustrating by way of example the principles of the invention.

DETAILED DESCRIPTION

The invention includes a method and apparatus for optimizing link transmission parameters between access nodes within a mesh network. Link power levels and data rates between neighboring access nodes are selected for desired link quality. Routing paths through the mesh network can be selected after power levels and data rates between links of neighboring access nodes have been selected.

There are tradeoffs to operating a link at different transmit power levels. A higher transmit power choice leads to better probability of successful packet reception at the other end of a link. On the other hand, operating at a higher power level typically results in increased interference across a larger area, resulting in a reduction in available network-wide airtime and overall network capacity. Similarly, there are tradeoffs to operating a link at different transmit data rates. Operating at a higher transmit rate (if the link supports it) can result in more efficient use of airtime, since it takes less time to transmit a bit. As a result, network capacity can be increased. On the other hand, higher data rates require a larger signal-to-noise ratio at the receiver for successful packet reception, and using a higher data rate may result in higher probability of packet loss, necessitating retransmissions.

Transmission protocols can comprise multiple data rates. For example, the IEEE 802.11g standard specifies operating data rates including 1 Mbps, 2 Mbps, 5.5 Mbps, 6 Mbps, 9 Mbps, 11 Mbps, 12 Mbps, 18 Mbps, 24 Mbps, 36 Mbps, 48 Mbps and 54 Mbps. Successful transmission at the higher data rates requires higher levels of SNR (signal-to-noise ratio) at the receiver. The transmission time required per bit can be lower, the higher the data rate.

Figure 2:
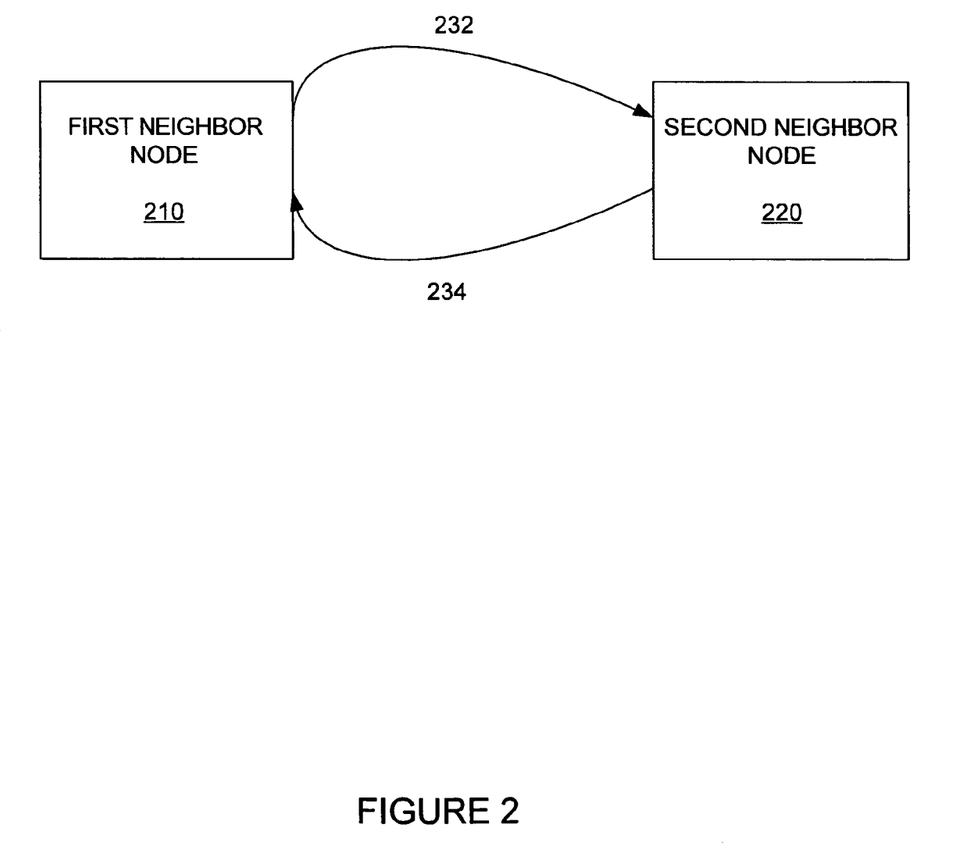
FIG. 2 shows neighboring access nodes selecting communication link power levels and data rates.

FIG. 2 shows neighboring access nodes selecting communication link power levels and data rates. A first neighboring access node 210 transmits packets at multiple different power levels and data rates. The packet transmission can be broadcast or unicast. A second neighboring access node 220 receives the packets at the multiple different power levels and data rates. The second neighboring access node 220 selects a combination of power level and data rate based upon a selection process. The selection process attempts to provide the combination of power level and data rate that provides the best quality communications link between the first and second neighboring access nodes. The qualities of an exemplary best quality link include an optimization of expected data throughput of the link, and minimization of interference with other links within the mesh network. Depending upon characteristics of the mesh network, such as node density and transmit signal attenuation, the power levels and data rates of the links of the mesh network that are optimal can vary.

Each access node 210, 220 can independently select the power level and data rates of transmission signals received from each neighboring access node 210, 220. At least two direction links 232, 234 exist between the neighboring access nodes 210, 220. One embodiment includes the power levels and data rate for the two directional links 232, 234 being the same. Another embodiment includes the possibility that the power levels and data rate for the two directional links 232, 234 are different. The selection of power level and data rate of the first directional link 232 can be made by the receiving access node 220. The receiving node 220 can convey the selection back to the transmitting node 210. The selection of power level and data rate of the second directional link 234 can also be made by the receiving access node 210. The receiving node 210 can convey the selection back to the transmitting node 220. The transmitting node (either the first access node 210 or the second access node 220) then transmits data according to the selected power level and data rate.

Many different methods can be used for timing the selection of the power levels and data rates. The selections can be made and remade at anytime. One selection process includes making new selections periodically in case the optimal choice changes over time. That is, reselecting data rate and power levels can occur once every set period of time for each link and in each link direction. Another selection process includes making new selections if the quality of the communications links between the neighboring access nodes at a currently-chosen combination of data rate and power level falls below a predetermined threshold. The reselecting can occur adaptively based on changes in an interference metric.

Figure 3:
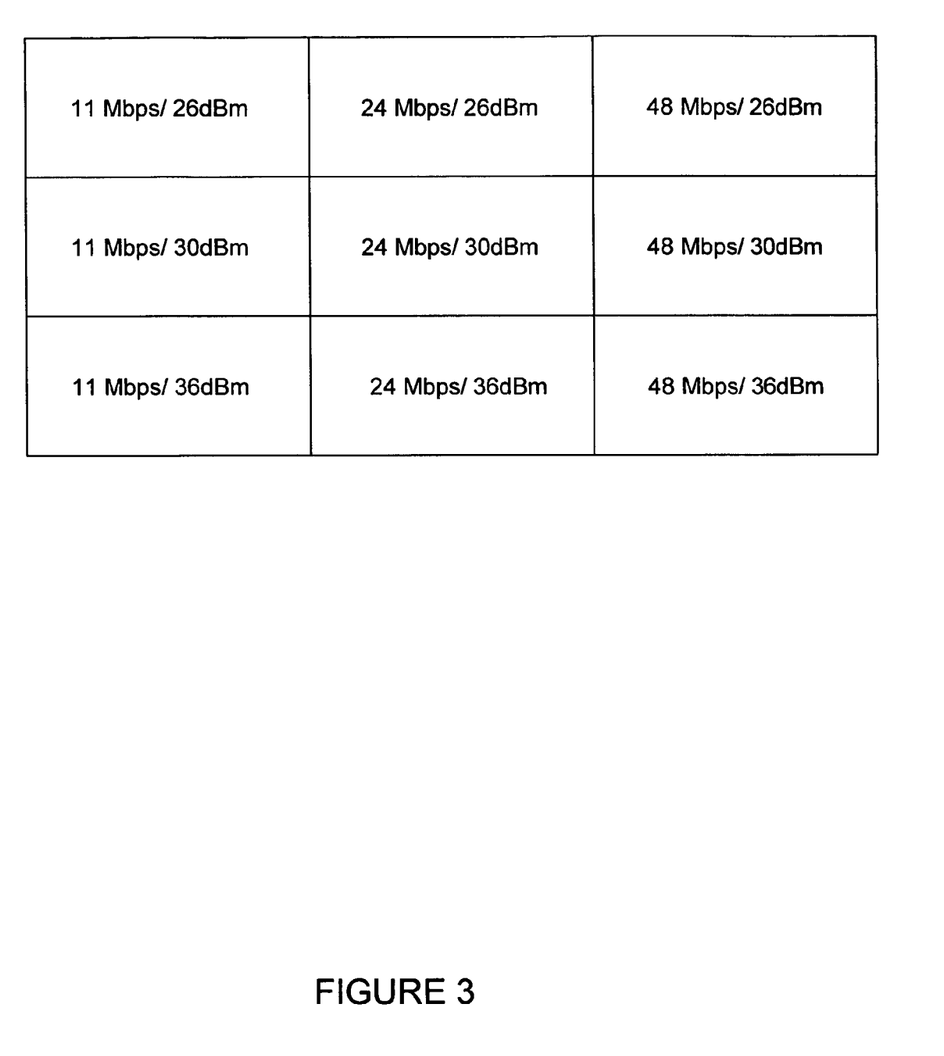
FIG. 3 is a table showing exemplary permutations of communication link power levels and data rates.

FIG. 3 is a table showing exemplary permutations of communication link power levels and data rates. These combinations of power level and data rate correspond with the 802.11 wireless standards. Other power levels and data rates can also be used for communication links between access nodes of the mesh network. The general concept is that typically a finite number of power levels and data rates are available for the transmission links. Even if a continuum of power levels exists, a finite number of representative power levels can be selected from the continuum. Within a mesh network, the most desirable transmission power level and data rate can vary from one access node to another access node. Additionally, the most desirable power level and data rate can vary depending upon the direction of transmission, and can vary over time. The desired routing of data paths through the mesh network can be influenced by the power level and data rate selections of the links of neighboring access nodes within the mesh network.

Rate and Power Level Selection

Figure 4A:
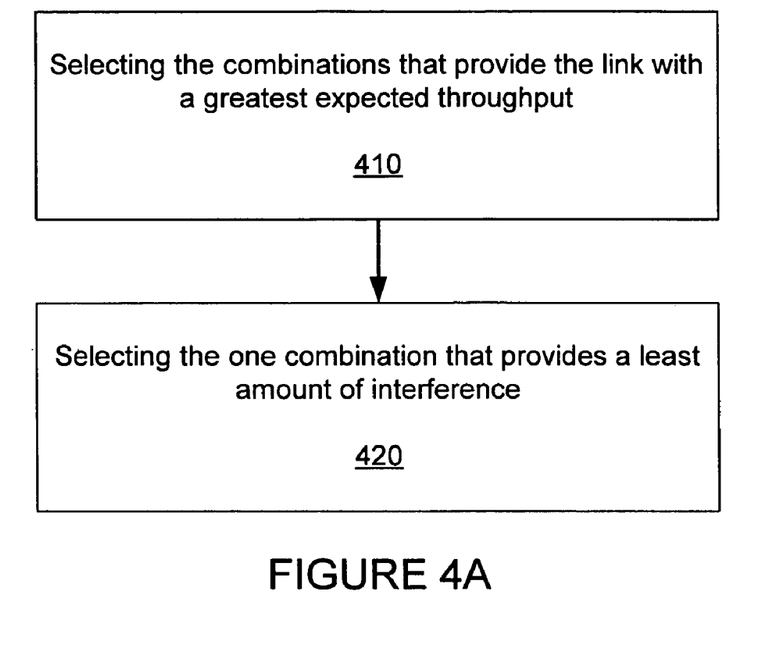
FIG. 4A is a flow chart showing a first method of selecting neighboring access node communication link power level and data rate.

FIG. 4A is a flow chart showing a first method of selecting neighboring access node communication link power level and data rate. A first step 410 includes selecting the combinations that provide the link with a greatest expected throughput, and a second step 420 includes from the greatest expected throughput combinations, selecting the one combination that provides a least amount of interference.

Throughput

An exemplary method of determining expected throughput includes determining a packet success rate. The packet success rate provides a prediction of a channel capacity of a link, which provides an estimate of the expected throughput of the link. The packet success rate is the rate in which packets are successfully transmitted through the link compared to the total number of transmitted packets. An exemplary measurement of packet success rate is based on successful transmission of broadcast or unicast packets through the link. Typically, the transmission data rate is fixed, and the number of successfully transmitted packets determines the packet success rate at that data rate. Routing beacons as discussed later can be used for determining the packet success rate because a set number of routing beacons are transmitted from each access node over a period of time. The packet success rate can be determined by comparing the number of routing beacons received at an access node with the fixed number of routing beacons transmitted over the link over a period of time.

The expected throughput test can be used to provide a set of combinations of power levels and data rates that provide the best expected throughput. However, a power level and rate combination selected base on expected throughput alone may not be desirable for interference reasons. That is, a power level and rate combination selected for maximizing expected throughput of a link may cause excessive interference to other links of a network that are proximate to the link being evaluated. Generally, a lower transmission power link will cause less interference in a mesh network. Therefore, a first order interference-based selection includes selecting the lowest power combination among the set of combinations that maximize throughput.

Figure 4B:
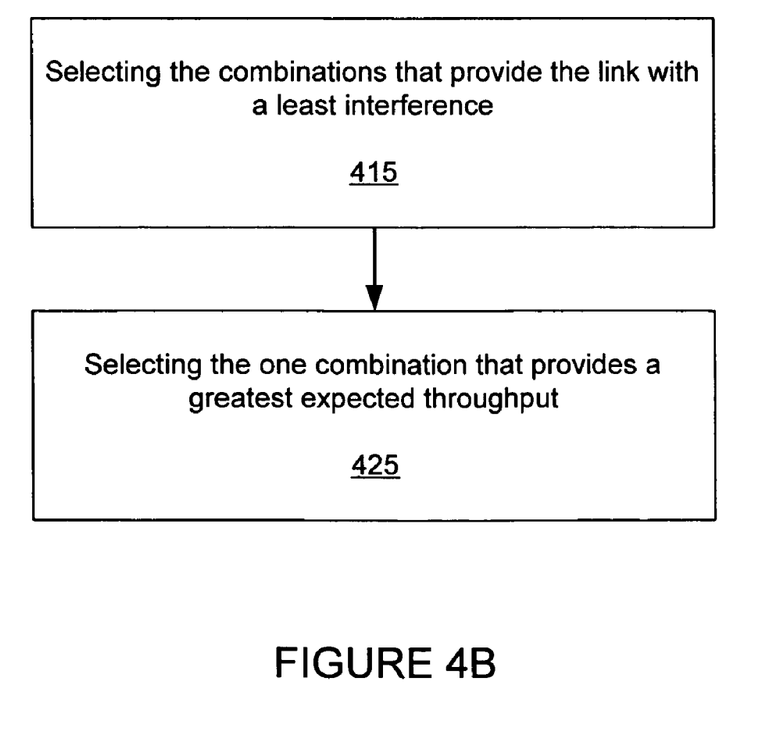
FIG. 4B is a flow chart showing a second method of selecting a neighboring access node communication link power level and data rate.

FIG. 4B is a flow chart showing a second method of selecting a neighboring access node communication link power level and data rate. A first step 415 includes selecting the combinations that provide the link with a least interference, and a second step 425 includes from the least interference combinations, selecting the one combination that provides a greatest expected throughput.

Interference

Medium access protocols such as 802.11 implement Carrier Sense Multiple Access with Collision Avoidance (CSMA/CA). In such protocols, transceivers sense a channel (link) and defer transmissions while the channel is considered to be busy. The channel is deemed to be busy if a received signal exceeds a Clear Channel Assessment Threshold. One definition of interference generated by a link (operating at a given combination of data rate and power level) when transmitting is given by the multiplying together (1) the number of nodes at which the received signal strength is greater than the Clear Channel Assessment threshold, (2) the fraction of time that the threshold is exceeded during operation, as averaged over a sufficiently long interval of time and (3) the time (airtime) required to transmit a bit at that combination of data rate and power level. It is to be understood that other definitions of interference could also be employed. In one embodiment, each node that is interfered with (interfered node) by a given transmitting node can provide an indication of interference to the transmitting node. This feedback can be provided either through broadcast frames or through unicast packets after routes have been set up. This feedback allows the transmitting node to compute the interference caused when the transmitter is transmitting. Another method of estimating interference includes determining magnitudes of received power levels at other nodes within the mesh network relative to a threshold required for reception.

As previously described, power and rates combinations having the lowest power level, typically introduce the least amount of interference of neighboring links. Therefore, an exemplary first order power and rate selection includes selecting the power and rate combinations that cause the least amount of interference to other access nodes within the network. After selecting based upon interference, a final power level and rate selection can be made based upon maximizing the expected throughput.

Other embodiments include variations on the above-described methods of selecting neighboring access node communication link power levels and data rates. For example, another method includes determining a level of use of clients connected to the mesh network. If the level of use is below a predetermined threshold, then the one of the combinations that provides the greatest expected throughput is selected. If the level of use is above the predetermined threshold, then the one of the combinations that provides a predetermined level of expected throughput, and a minimal amount of interference is selected.

The level of use of the clients can be determined by tallying the number of active client devices attached to each node, or by taking into account the airtime usage for active client devices. Other methods of determining level of use can be used as well.

Routing Selections

Figure 5:
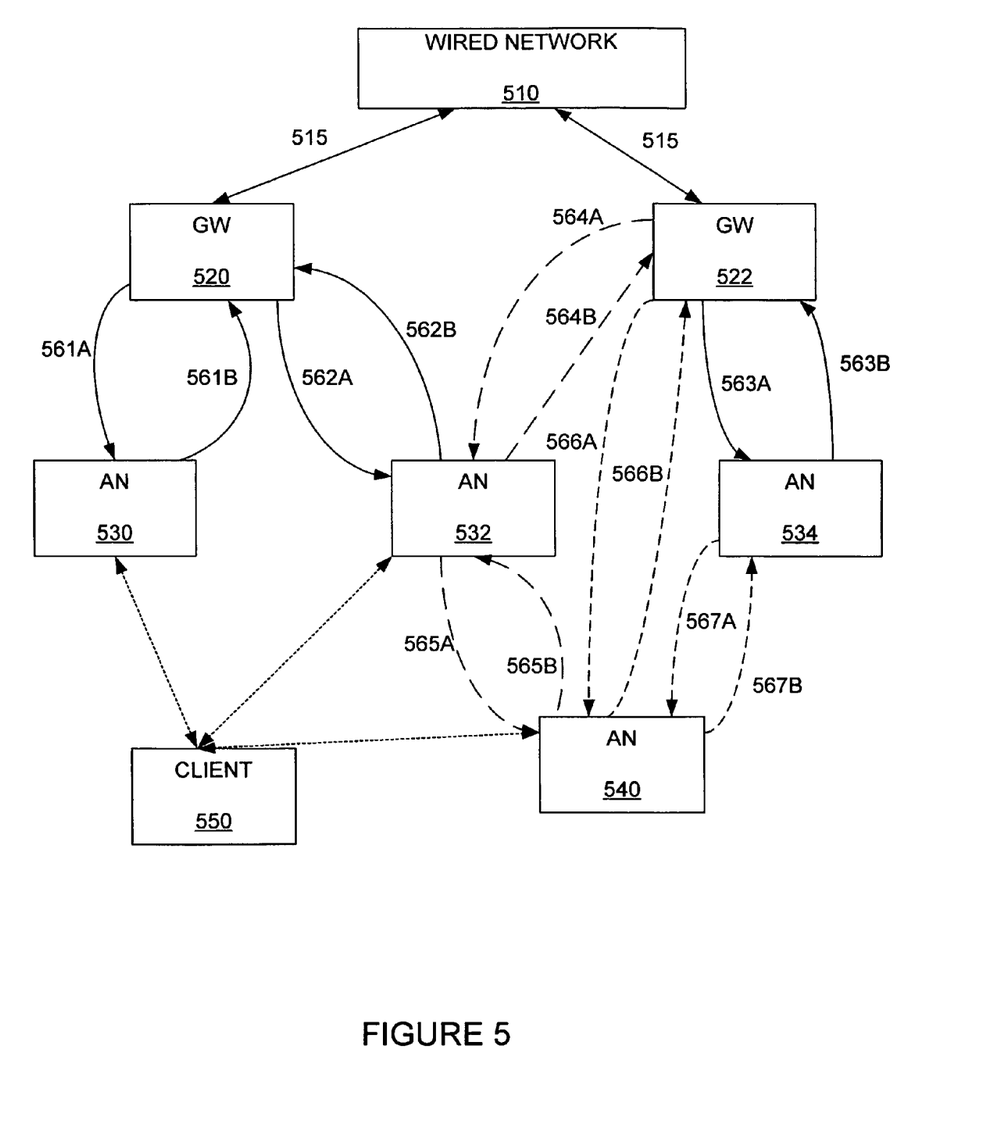
FIG. 5 shows a mesh network in which routing paths are selected based upon uplink qualities and downlink qualities that include power level and data rate selections.

FIG. 5 shows a mesh network in which routing paths are selected based upon communication links that include power level and data rate selections. As will be described, routing selections are made based upon routing beacons that are transmitted at all relevant power levels and data rates. An exemplary embodiment includes routing selections within the mesh network being made after the power level and data rate selections have been made by neighboring access nodes within the mesh network. In this embodiment, the data rate selection and power level selection operate independently of routing selections of paths within the wireless mesh network. Selecting routing paths through the access nodes of the mesh network can be conditioned upon the selected combinations of data rate and power level for each link between each transmitting/receiving pair of access nodes within the mesh network.

The wireless network includes gateways 520, 522 which are coupled to the wired network 510. The gateways 520, 522 typically include high bandwidth connections 515 to the wired network 510 which can be wired or wireless. A gateway is an access node that can originate routing beacons, as will be described.

Access nodes 520, 522, 530, 532, 534, 540 are coupled either directly or indirectly to the gateways 520, 522. That is, each access node is either directly connected to an upstream gateway 520, 522, or indirectly connected through another access node to at least one of the upstream gateways 520, 522. Many factors can be included in the decision of which access nodes or gateways each access node is connected. The network of FIG. 5 can include any number of additional gateways and access nodes. As shown in FIG. 5, a client 550 can obtain access to the network by establishing a connection to an available access node, such as, any of access nodes 530, 532, 540.

Gateways 520, 522 broadcast routing packets (beacons); which can be used to determine routing between access nodes 530-540 and gateways 520, 522 of the network. The beacons are received by all first-level access nodes (for example, access nodes 530, 532, 534), which are access nodes that are able to receive gateway transmitted beacons, and directly route data through to a gateway. The beacons are transmitted at all relevant power levels and data rates. Relevant power levels and data rates can include all possible power levels and data rates, or a subset of the available power levels and data rates. Receiving access nodes receive the beacons at the preselected power levels and data rates.

The beacons are used to establish a route from each access node to a gateway. The first level access nodes re-broadcast the beacon data, attaching their own information to the beacon. The information indicates to the second level access nodes that the path to the gateway includes the first level access node. The first level access nodes re-broadcast the beacons at all relevant power levels and data rates.

Relevant Power Levels and Data Rates

As noted earlier, there can be a large number of data rates that are supported by a communications protocol such as 802.11 g. Furthermore, there can be a continuum of power levels that can be supported by a radio transmitter. From the potentially large number of data rates, it is possible to select a subset of relevant data rates. One exemplary embodiment includes this selection being based on pre-set configuration parameters of the transmitter. Another exemplary embodiment includes this selection being based on selecting the data rates that can be supported in a mesh network for a given spacing or density of access nodes. For instance, with a high density of access nodes per square mile, the selected relevant data rates might comprise 24 Mbps, 36 Mbps and 48 Mbps. For a low density of access nodes per square mile, the relevant data rates might comprise 1 Mbps, 2 Mbps, 5.5 Mbps and 6 Mbps, since higher data rates require more SNR on each link than can be supported at that low node density. Other selection criteria can also be used to select relevant data rates. In another embodiment, the set of relevant data rates is dynamically determined by the access node based on the number of its neighbors and the signal-to-noise ratio from those neighboring transmitters.

Also, as noted earlier, there can be a continuum of power levels that a transmitter can operate at. For example, FCC (Federal Communication Commisssion) rules in the United States allow a 2.4 GHz transmitter to operate at any power level below 1 W (30 dBm). A subset of relevant power levels can be selected by a transmitter in a number of ways. In one embodiment, this selection is based on pre-set configuration parameters of the transmitter. In another embodiment, this selection is based on selecting the power levels based on the spacing or density of access nodes. For instance, with a high density of access nodes per square mile, the selected relevant power levels might comprise 20 dBm, 22 dBm, and 24 dBm. For a low density of access nodes per square mile, the relevant power levels might comprise 28 dBm and 30 dBm, since lower densities of access nodes would require higher power levels to achieve the required SNR on each link. Other selection criteria can also be used to select relevant power levels. For example, in another embodiment, the set of relevant power levels is dynamically determined by the access node based on the number of its neighbors and the signal-to-noise ratio from those neighboring transmitters.

From the relevant power levels and data rates that have been selected, the access node can construct a combination of relevant power levels and data rates. The access node can transmit beacons on each of the chosen relevant combinations of power levels and data rates.

Routing Selections

As previously described, the beacons are used to establish a route from each access node to a gateway. The first level access nodes re-broadcast the beacon data, attaching their own information to the beacon. The information indicates to the second level access nodes that the path to the gateway includes the first level access node. The first level access nodes re-broadcast the beacons at all relevant power levels and data rates.

For one embodiment, the link quality of the beacon received determines whether that beacon is rebroadcast by the system. If the quality of the beacon is above a determined threshold, it is rebroadcast. Another embodiment includes each access node only rebroadcasting beacons received from its currently-chosen default gateway, where a default gateway is a previously chosen gateway. The beacons can be used to determine the quality of the link in both an upstream (towards a gateway) direction, and in a downstream (away from a gateway) direction. The upstream and the downstream link qualities can be used by each access node to select the best data routing path to a gateway. The link qualities of both the upstream links and the downstream links can be influenced by the pre-selected power levels and data rates of neighboring access nodes. The link qualities may also be influenced by other wireless transmission factors such as interference, noise and fading.

The first level access nodes 530, 532, 534 include upstream links, and downstream links to the gateways 520, 522. As shown in FIG. 5, access node 530 includes a downstream link 561A and an upstream link 561B with the gateway 520, access node 532 includes a downstream link 562A and an upstream link 562B with the gateway 520, and access node 534 includes a downstream link 563A and an upstream link 563B with the gateway 522. The quality of a downstream link can be different than the quality of the corresponding upstream link. For example, the quality of the downstream link 561A can be different than the quality of the upstream link 561B, the quality of the downstream link 562A can be different than the quality of the upstream link 562B, and the quality of the downstream link 563A can be different than the quality of the upstream link 563B. Link asymmetries can arise because of differences in transmit power levels at each end of the link, or due to environmental effects or signal interference.

The asymmetrical characteristics of the links between access nodes and the gateways can lead to non-optimal routing selections if, for example, the quality of the upstream links is not included in routing decisions by access nodes to gateways. Each gateway and access node transmits beacons. All access nodes and gateways that receive the beacons can make an estimate of the quality of the link based upon the reception of the beacons. The estimates can include both upstream link quality and downstream link quality. Once each access node has the upstream and downstream link qualities within every possible data path to a gateway, the access node can make a selection of the best available data path.

As shown in FIG. 5, the first level access node 532 routes data through the gateway 520. However, the access node 532 could have selected the gateway 522 to route data. A possible link between the access node 532 and the gateway 522 includes the downlink 564A and the uplink 564B. The access node 532 selects the gateway to route data by selecting the best combination of uplinks and downlinks. What is the best combination can depend upon the type of data being routed to and from the gateway. If the access node 532 determines that the downlink 564A/uplink 564B combination of the gateway 522 is better than the downlink 562A/uplink 562B combination of the gateway 520, then the access node 532 can select to route date through the gateway 522.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

FIG. 5 also includes a second level access node 540. As shown, the access node 540 can select a data path through access node 532 (through downlink 565A and an uplink 565B), through access node 534 (through downlink 567A and an uplink 567B), or through gateway 522 (through downlink 566A and uplink 566B). The access node 540 makes a data path routing selection based upon the best quality combination of the links (downstream and upstream, at selected power level and data rate combinations) within the available data paths to a gateway.

The depth of re-broadcast can be determined by the network. For example, an access node may rebroadcast a beacon only if there are 5 or fewer hops between the access node and the gateway. The number of hops associated with an access node defines how many intermediate access nodes there are between the access node and a gateway. First level access nodes (as defined above) are one hop away from a gateway. Second level access nodes are two hops away from a gateway.

Figure 6:
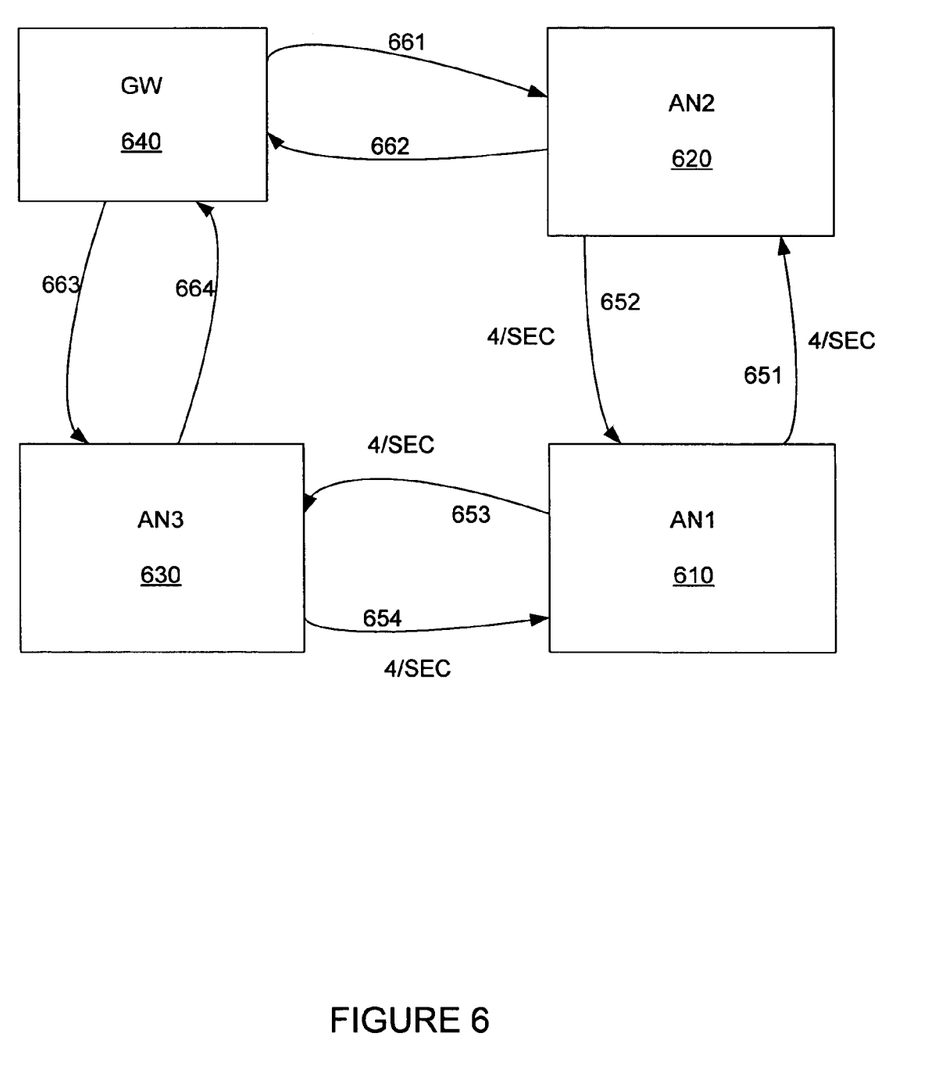
FIG. 6 shows access nodes determining and communicating link qualities of communication links between the access nodes, transmitting at the selected power levels and data rates.

FIG. 6 shows access nodes determining and communicating link qualities of communication links between the access nodes, wherein transmission of the links are at the selected power levels and data rates. In a first embodiment, a first access node 610 transmits first routing packets at all relevant power levels and data rates. The first routing packets are received by a second access node 620 over a first direction 651 of a first link, at a selected power level and data rate (as selected by receiving nodes). In a second embodiment, the first access node 610 only transmits first routing packets at a subset of power levels and data rates. An embodiment includes the access node 610 transmitting a predetermined number of routing packets per unit of time. For example, FIG. 6 indicates that 4 routing packets are transmitted per second, at all relevant power levels and rates. The second access node 620 receives the first routing packets at the selected power level and data rate, and determines a quality of the first direction 651 of the first link. The quality of the first direction 651 of the first link can be determined, for example, by calculating the percentage of first routing packets that are successfully received by the second access node 620. If, for example, 3 routing packets per second are received by the second access node 620, the second access node can determine the quality of the first direction 651 of the first link to be 75%.

In a first embodiment, the second access node 620 transmits second routing packets at all relevant power levels and data rates. In a second embodiment, the second access node 620 transmits second routing packets at a subset of power levels and data rates. The second routing packets can be received by the first access node 610 over a second direction 652 of the first link, at the selected power level and rate. Again, the second access node 620 can transmit a predetermined number of routing packets per unit of time, at all relevant power levels and rates. For example, FIG. 6 indicates that 4 routing packets are transmitted per second. The second routing packets can be transmitted to include the quality of the first direction 651 of the first link. The first access node receives at least one of the second routing packets over a second direction of the first link, at a selected power level and rate, and determines a first direction link quality of the first link based upon the second routing packets. The first access node can also determine a second direction link quality of the first link based upon the second routing packets by calculating the percentage of successfully received second routing packets.

If the access nodes 610, 620 are within a mesh network as shown in FIG. 2, an embodiment includes the first access node being downstream from the second access node, and the first access node making a routing decision to a gateway (such as gateway 640) based upon the second routing packets. More specifically, the routing decision can be based upon information within the second routing packets (for example, first direction link quality), and/or the routing decision can be based upon a quality of the received second routing packets (for example, the percentage of second routing packets received or second routing packet SNR).

An embodiment includes the first access node 610 being downstream from the second access node 620, and the first access node 610 making a routing decision to a gateway 640 based at least partially upon the first direction link quality of the first link and the second direction link quality of the first link. As stated earlier, the first direction link quality can be determined by determining a percentage of routing packets per unit of time received by the second access node 620, and the second direction link quality can be determined by determining a percentage of second routing packets per unit of time received by the first access node 610.

The mesh network can additionally include a third access node 630 receiving at least one of the first routing packets over a first direction 653 of a second link from the first access node 610, a selected power level and data rate. The third access node 610 can also transmit third routing packets at all relevant power levels and rates. An embodiment includes the first access node receiving at least one of the third routing packets over a second direction 654 of the second link, at a selected power level and rate, and determining a first direction link quality of the second link based upon the third routing packets.

Having received the second routing packets and the third routing packets, the first access node 610 can select a route through at least one of the second node and the third node at least partially based upon the first direction link quality of the first direction of the first link and the first direction link quality of the first direction of the second link.

The mesh network can further include a gateway 640 which the second access node 620 and third access node 630 can be connected. The connections include downstream links 662, 663 and upstream links 662, 664. As will be described, the further upstream links can be used for data path selections to the gateways. Eventually, routing packets transmitted by all access nodes within the mesh network include information about all neighboring access nodes. This information typically includes forward and reverse link qualities of all neighboring access nodes. A neighboring access node is one which can receive routing packets directly (without being delayed) or that can transmit routing packets directly (without being delayed) to the access node.

The routing packets can be designated as beacons, and include routing information. The beacons can be transmitted according to an 802.11 protocol. Any of the access nodes can be operable as gateways.

Figure 7:
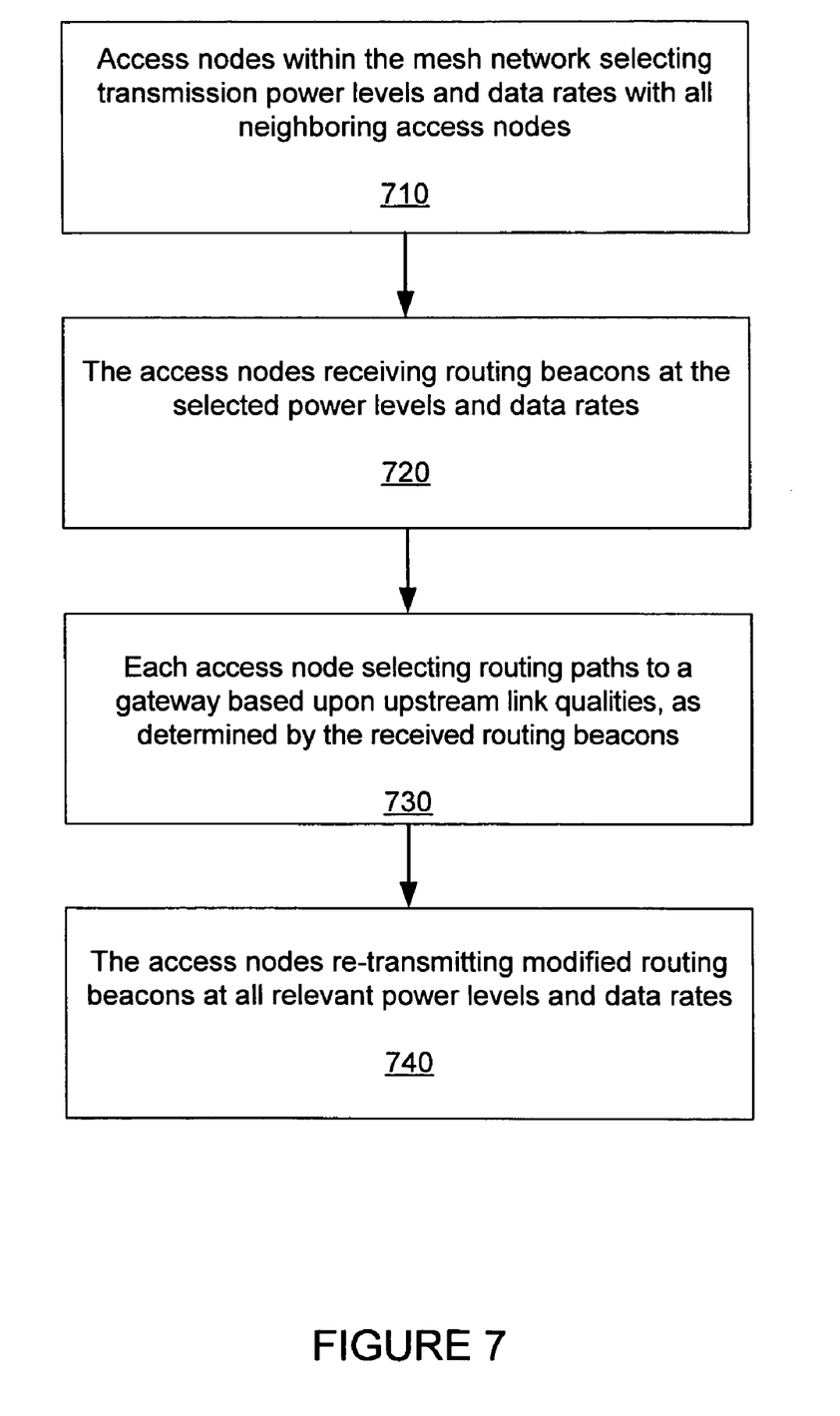
FIG. 7 is a flow chart showing a method of selecting routing paths through a mesh network based upon uplink qualities and downlink qualities that include power level and data rate selections.

FIG. 7 is a flow chart showing a method of selecting routing paths through a mesh network based upon uplink qualities and downlink qualities that include power level and data rate selections. A first step 710 includes access nodes within the mesh network selecting transmission power levels and rates with all neighboring access nodes. A second step 720 includes access nodes receiving routing beacons at the selected power levels and rates. A third step 730 includes each access node selecting routing paths to a gateway based upon upstream link qualities, as determined by the received routing beacons. A fourth step 740 includes the access nodes re-transmitting modified routing beacons at all relevant power levels and rates.

The first step 710 includes receiving nodes selecting power levels and data rates for the links between the access nodes. The selection process can be as previously described.

The second step 720 includes each access node receiving routing beacons from either a gateway or an upstream access node. Each access node can receive routing beacons from multiple nodes. The beacons are received at the power levels and rates that correspond with the selected power level and rates as determined by the first step 710. That is, routing beacons can be received at different power levels and rates depending upon the receiving node (or gateway) that transmitted the routing beacon.

The third step 730 includes each access node evaluating the quality of the received beacons, and selecting an upstream node (gateway or access node) based upon the quality of the received beacon. The selection process can include both link quality in both upstream and downstream directions.

The fourth step 740 includes the access nodes re-broadcasting the beacon data, attaching their own information to the beacon. The information indicates to the next level access nodes that the path to the gateway includes the access node. The access nodes can re-broadcast the beacons at all relevant power levels and data rates, or a subset thereof. The beacons are used to establish a route from each access node to a gateway.

Although specific embodiments of the invention have been described and illustrated, the invention is not to be limited to the specific forms or arrangements of parts so described and illustrated. The invention is limited only by the appended claims.

What is claimed:

1. A method of optimizing link transmission parameters between access nodes within a mesh network, comprising:
   each access node within the mesh transmitting packets at N different combinations of data rates and power levels;
   each receiving node that receives data packets at one or more of the N combinations, selecting a most desirable one of the received combinations; wherein selecting a most desirable one of the received combinations comprises selecting the combinations that provide a link with a greatest expected throughput from transmitting node to receiving node, and from the greatest expected throughput combinations, selecting the one combination that causes a least amount of interference to other nodes in the mesh network; and each receiving node indicating to corresponding transmitting nodes the selected most desired combination for transmitting to the receiving node.

2. The method of claim 1, wherein each transmitting node uses the selected most desired combination to transmit to corresponding receiving nodes.

3. The method of claim 1 wherein expected throughput is determined by measuring a packet success rate of a transmission link between the receiving node and the transmitting node.

4. The method of claim 1, wherein an estimate of the interference includes magnitudes of received power levels at other nodes within the mesh network relative to a threshold required for reception.

5. The method of claim 4, wherein the estimate of the interference comprises determining a number of interfered nodes.

6. The method of claim 5, wherein the estimate of the interference further factors an airtime required per transmitted bit.

7. The method of claim 4, wherein the estimate of the interference comprises determining a fraction of time that the threshold is exceeded over a time interval, for each interfered node.

8. The method of claim 1, wherein the estimate of interference consists of summing over all interfered nodes a product of (i) a fraction of time that a threshold is exceeded on each of interfered nodes and (ii) an airtime required for the transmitting node to transmit a bit to the receiving node.

9. The method of claim 1, wherein selecting a most desirable one of the received combinations of data rate and power level comprises:
  determining a level of use of clients connected to the mesh network;
  if the level of use is below a predetermined threshold, then selecting the one of the N combinations that provides the greatest expected throughput;
  if the level of use is above the predetermined threshold, then selecting the one of the N combinations that provides a predetermined level of expected throughput, and a minimal amount of interference to other nodes in the mesh network.

10. The method of claim 1, further comprising each access node periodically re-selecting a most desirable one of the received rate and power level combinations for transmission over each link.

11. The method of claim 10, wherein reselecting data rate and power levels occurs once every set period of time for each link and in each link direction.

12. The method of claim 10, wherein reselecting occurs adaptively based on changes in an interference metric.

13. The method of claim 1, wherein data rate and power combinations includes those defined by 802.11 standards.

14. The method of claim 1, further comprising:
  selecting routing paths through the access nodes of the mesh network conditioned upon the selected combinations of data rate and power level for each link between each transmitting/receiving pair of access nodes within the mesh network.

15. The method of claim 14, wherein routing beacons are originated at gateways of the mesh network and transmitted at all relevant data rates and power levels.

16. The method of claim 15, wherein relevant data rates and power levels are defined by a transmission protocol being used.

17. The method of claim 15, wherein relevant data rates and power are a subset of available data rates and power levels, and the subset is determined by preset configuration parameters of the transmitting nodes.

18. The method of claim 15, wherein relevant data rates and power are a subset of available data rates and power levels, and the subset is determined by a density of nodes within the mesh network.

19. The method of claims 15, wherein the beacons are transmitted at a predetermined rate.

20. The method of claim 15, wherein each access node that receives the routing beacons selects a routing path to a gateway based upon a quality parameter of the received routing beacons.

21. The method of claim 20, wherein only the routing beacons at the selected most desired combination of data rate a power lever are used for selecting the routing path.

22. The method of claim 21, further comprising both uplink and downlink qualities being used in selecting routing paths, wherein the uplink and down link data rate and power level combinations correspond with the selected most desired combinations.

23. A method of optimizing link transmission parameters between access nodes within a mesh network, comprising:
  each access node within the mesh transmitting packets at N different combinations of data rates and power levels;
  each receiving node that receives data packets at one or more of the N combinations, selecting a most desirable one of the received combinations, wherein selecting a most desirable one of the received combinations comprises; selecting the combinations that allow a link to cause a least interference to other nodes in the mesh network; and from the least interference combinations, selecting the one combination that provides a greatest expected throughput from the transmitting node to the receiving node:
  each receiving node indicating to corresponding transmitting nodes the selected most desired combination for transmitting to the receiving node.

24. The method of claim 23, wherein expected throughput is determined by measuring a packet success rate of a transmission link between the neighboring access node and the transmitting access node.

25. The method of claim 23, wherein an estimate of the interference includes magnitudes of received power levels at other nodes within the mesh network relative to a threshold required for reception.

26. The method of claim 23, wherein the estimate of the interference comprises determining a number of interfered nodes.

27. The method of claim 23, wherein the estimate of the interference comprises determining a fraction of time that the threshold is exceeded over a time interval, for each interfered node.

28. The method of claim 27, wherein the estimate of the interference further comprises an airtime required per transmitted bit.

29. The method of claim 23, wherein the estimate of the interference consists of summing over all interfered nodes a product of(i) a fraction of time that a threshold is exceeded on each of interfered nodes and (ii) an airtime required for the transmitting node to transmit a bit to the receiving node.

30. A method of a selecting transmission parameters of an access node within a mesh network, comprising:
  the access node receiving data packets from neighboring access nodes through transmission signals having N combinations of data rate and power level;
  the access node selecting a most desired combination of data rate and power level for each link between the access node and each neighboring access node, comprising selecting the combinations that provide the link with a greatest expected throughput, and from the greatest expected throughput combinations, selecting the one combination that creates a least amount of interference;

the access node communicating the selected combination back to each corresponding neighboring access node; and the access node receiving data packets from the neighboring nodes transmitted at the selected combinations of data rates and power levels.

31. The method of claim 30, wherein selecting a most desired combination of data rate and power level comprises:

determining a level of use of clients connected to the mesh network;

if the level of use is below a predetermined threshold, then selecting the one of the N combinations that provides the greatest expected throughput;

if the level of us is above the predetermined threshold, then selecting the one of the N combinations that select that combination that provides a predetermined level of expected throughput, and a minimal amount of interference.

* * * * *